United States Patent Office 3,417,100
Patented Dec. 17, 1968

3,417,100
8,(9)-DEHYDRO-6-THIAESTRONE-3-METHYL
ETHER
Henderikus O. Huisman, Amstelveen, Johannes Gerardus
Westra, Amsterdam-Osdorp, Willem Nico Speckamp,
Amstelveen, and Upendra K. Pandit, Amsterdam, Netherlands (all % Laboratory for Organic Chemistry University of Amsterdam, Nieuwe Achtergracht 129,
Amsterdam, Netherlands
No Drawing. Filed Apr. 29, 1966, Ser. No. 546,167
2 Claims. (Cl. 260—327)

ABSTRACT OF THE DISCLOSURE

Disclosed is the preparation of dehydro-6-thiaestrone-3-methyl ethers useful as antifertility agents by reaction of 7-methoxythiachroman-4-one with a vinyl magnesium halide, reaction of the resulting 4-vinyl-4-hydroxy compound with 2-methyl-1,3-cyclopentadione and cyclization of the product obtained thereby.

This invention relates to certain novel 6-thiasteroids of value as antifertility agents and, more particularly, to d,l-8,(9)dehydro-6-thiaestrone methyl ether-3 and d,l-3-methoxy-8-dehydro-6-thiaestradiol.

There are thus provided, according to the present invention, the novel compounds d,l-8,(9)-dehydro-6-thiaestrone methyl ether-3 and d,l-3-methoxy-8-dehydro-6-thiaestradiol; the preferred embodiments of this invention are the 14α-isomers of these two compounds.

As intermediates for use in the preparation of the products of the present invention there are also provided, according to the present invention, the compounds having the formulae

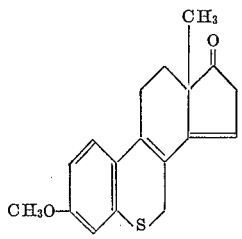

and

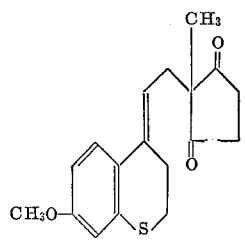

There is further provided, according to the present invention, the procedures for the preparation of the compounds of the present invention which comprise the following:

(a) The process of producing d,l-8,(9)-dehydro-6-thiaestrone methyl ether-3 which comprises catalytically hydrogenating, most advantageously with palladium on calcium carbonate in tetrahydrofuran, the compound having the formula

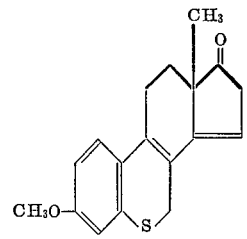

(b) The process of producing d,l-8,(9)-dehydro-6-thiaestrone methyl ether-3 which comprises oxidizing, most advantageously with aluminum isopropylate in cyclohexanone, d,l-8,(9)-dehydro-6-thiaestrone methyl ether-3, (c) The process of producing the compound of the formula

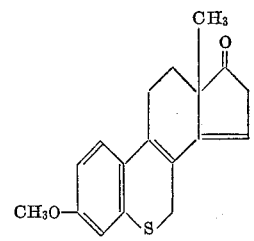

which comprises cyclizing, most advantageously by heating a solution thereof in an inert solvent in the presence of a strong acid such as p-toluenesulfonic acid, a compound of the formula

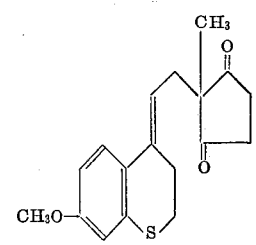

and (d) The process of producing the compound of the formula

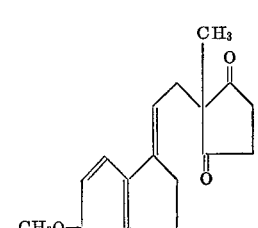

which comprises heating a mixture of 4-hydroxy-4-ethynyl-7-methoxy-triachromane and 2-methyl-cyclopentane-1,3-dione, preferably to reflux temperatures in an organic solvent arranged to remove the water formed in the condensation reaction and most advantageously in the presence of a catalytic amount of a solvent-soluble, strong base such as trimethylbenzylammonium hydroxide.

The compounds of this invention are valuable pharmaceutical agents. They possess antifertility activity and are orally active antifertility agents in mammals and are of particular interest by virtue of their lack of estrogenic activity.

The antifertility tests of the compounds of the present invention were carried out on mice. The compounds were administered orally to adult female mice for six days. A single dose was administered three days before mating and single doses were administered daily for five days during mating. The mice were sacrificed on the eleventh day following mating and their uteri examined for implantation sites. The absence of implantation sites in the uteri indicated that pregnancy was completely inhibited. When, for example, the preferred compound of the present invention, d,l-8,(9)-dehydro-6-thiaestrone methyl ether-3, was administered orally at doses as low as 1.0 mgm./kg. per day, no implantation sites were observed in any of the mice tested, hence pregnancy was completely inhibited in each of the mice.

The following examples will serve to illustrate the present invention but it is not limited thereto. The "Reaction Scheme" which follows presents the structural formulae and the identification by Roman numerals of the compounds of the examples. All temperatures are given in degrees centigrade.

and water. After drying over magnesium sulfate the solvent was evaporated in vacuo yielding 30 g. of II as an oil which was not purified further.

IR $\gamma_{max.}^{CHCl_3}$ 3500 cm.$^{-1}$ (OH); UV $\gamma_{max.}^{EtOH}$ 223 (26000), 257 10000 and 288 (2250) nm.

(b) 2 - [2' - (7 - methoxy - thiachromanylidene)ethyl]-2-methylcyclopentane-1,3-dione (III)

30 g. of II in 150 ml. of dry xylene were added to a mixture of 15 g. of 2-methyl-cyclopentane-1,3-dione and 4 ml. of a trimethylbenzylammonium hydroxide ("Triton B") solution (40% in methanol) and the solution refluxed vigorously with stirring for 2 hours (oil bath temperature 155–160°). The water formed during the reaction was removed by means of a Dean-Stark separator. The cooled solution was extracted with a potassium hydroxide solution (5%) and water. After concentrating in vacuo the residue was crystallized from methanol, yielding 20 g. of crystalline III; M.P. 94–96°.

IR $\gamma_{max.}^{KBr}$ 1715 and 1755 cm.$^{-1}$ (carbonyl); UV $\gamma_{max.}^{EtOH}$ 228 (12800), 245 (23000) and 278 (14000) nm.

NMR (CDCl$_3$) δ singlet 1.1 (C$_{13}$–CH$_3$) and triplet 5.5 (C$_{11}$=H) p.p.m.

The compound gave a correct elementary analysis.

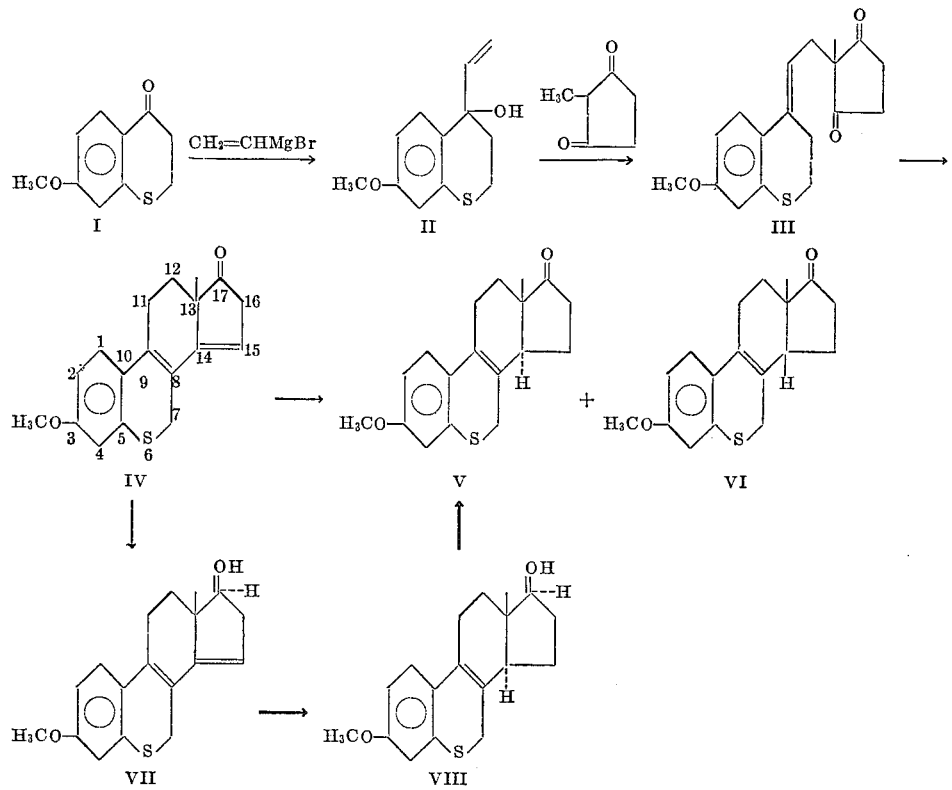

EXAMPLE 1

(a) 4-hydroxy-4-ethynyl-7-methoxy-thiachromane (II)

A solution of 28 g. of 7-methoxy-thiachromanone-4 (prepared according to See-Lee Chu et al., Chem. Abst. 1956, 11044) in 50 ml. of tetrahydrofuran and 80 ml. of ether was added with stirring to vinylmagnesium bromide, prepared from 12 g. of magnesium and 60 g. of vinylbromide in 165 ml. of tetrahydrofuran at −10°. After the addition was completed, the mixture was stirred for a period of two hours, during which time it was allowed to attain room temperature. After refluxing for one hour it was poured out into a mixture of 300 g. of ice and 50 g. of ammonium chloride. The organic layer was separated and washed with a saturated ammonium chloride solution

EXAMPLE 2 d,l-8-(9)-dehydro-6-thiaestrone methyl ether-3 (V)

A solution of 20 g. of III and 1.2 g. of p-toluene sulfonic acid in 500 ml. of benzene was refluxed for 10 minutes by immersing in an oil bath carefully maintained at 110°. After cooling the mixture was extracted with a solution of saturated aqueous sodium bicarbonate and dried over magnesium sulfate. Evaporation of the solvent yielded 18 g. of an oil which consisted largely of the ketone IV.

IR $\gamma_{max.}^{CHCl_3}$ 1735 cm.$^{-1}$ (C=O); NMR (CDCl$_3$) δ1.1 singlet (C$_{13}$—CH$_3$) and 5.8 triplet (C$_{11}$=H) p.p.m.

3 g. of IV in 20 ml. of tetrahydrofuran was hydrogenated over 6 g. of palladium on calcium carbonate (2%) in 30 ml. of tetrahydrofuran. After the uptake of the calculated amount of hydrogen (224 ml.) the catalyst was filtered and washed thoroughly with tetrahydrofuran. The filtrate was concentrated and after treatment of the residue with methanol 0.9 g. of crystalline V, M.P. 151–154°, were obtained. The 14α-isomer showed the following spectral characteristics:

IR $\gamma_{max.}^{KBr}$ 1735 cm.$^{-1}$ (C=O); $\lambda_{max.}^{EtOH}$ 213 (18000), 256 (29000) and 300 (6000) nm; NMR (CDCl$_3$) δ singlet 0.9 (C$_{13}$—CH$_3$) p.p.m.

The compound gave a correct elementary analysis and was an effective antifertility agent in the test described above at dosages as low as 1.0 mgm./kg.

After evaporation of the mother liquor an oil was obtained which according to its NMR spectrum mainly consisted of the 14β-isomer (VI). It showed the following spectral characteristics:

IR $\gamma_{max.}^{CHCl_3}$ 1735 cm.$^{-1}$ (C=O); UV $\lambda_{max.}^{EtOH}$ 216 (16000), 260 (25500) and 305 (5500) nm; NMR (CDCl$_3$) δ singlet 1.05 (C$_{13}$—CH$_3$) p.p.m.

EXAMPLE 3 d,1-3-methoxy-8,14-bisdehydro-6-thiaestradiol (VII)

To a solution of 15 g. of crude IV in 500 ml. of ethanol and 40 ml. of water 12 g. sodium borohydride was added. After stirring overnight at room temperature the flask was cooled in ice and acetic acid was added dropwise until pH=5 (ca. 40 ml.). After concentrating the solution in vacuo and adding a mixture of 500 ml. of water and 200 ml. of ether, the organic layer was extracted with saturated sodium bicarbonate solution and water. Drying over magnesium sulfate and evaporating the solvent afforded an oil which was crystallized from toluene. Yield 7 g.; M.P. 94–101°.

IR $\gamma_{max.}^{KBr}$ 3450 cm.$^{-1}$ (OH); UV $\lambda_{max.}^{EtOH}$ 225 (14800), 276 (23000) and 323 (13700) nm; NMR (CDCl$_3$) δ 1.0 singlet (C$_{13}$—CH$_3$) and 5.5 triplet (C$_{15}$=H) p.p.m.

The compound gave a correct elementary analysis.

EXAMPLE 4 d,1-3-methoxy-8-dehydro-6-thiaestradiol (VIII)

7 g. of VII were hydrogenated over 14 g. of palladium on calcium carbonate (2%) in 100 ml. of tetrahydrofuran. Working up yielded an oil which on crystallization from methanol gave 5.8 g. of VIII, M.P. 101–107°.

IR $\gamma_{max.}^{KBr}$ 3450 cm.$^{-1}$ (OH); UV $\lambda_{max.}^{EtOH}$ 214 (13600), 255 (21400) and 303 (4600) nm; NMR (CDCl$_3$) δ singlet 0.8 (C$_{13}$—CH$_3$) p.p.m.

The compound gave a correct elementary analysis. In the test described above this compound was found to be an effective antifertility agent at an oral dosage of 50 mgm./kg.

EXAMPLE 5 d,1-8,(9)dehydro-6-thiaestrone methyl ether-3 (V)

A mixture of 5.8 g. of VIII, 300 ml. of dry toluene, 6.6 g. of aluminum isopropylate and 12 ml. of cyclohexanone was refluxed for two hours, while toluene was added at the same rate as it was removed by distillation. The solution was extracted with potassium hydroxide solution (5%) and water and finally dried over magnesium sulfate. Removal of the solvent yielded an oil which upon crystallization from methanol yielded 3.1 g. of V; M.P. 151–154°. The compound was in every respect identical with that described in Example 2.

EXAMPLE 6

Compound IV is prepared in one reaction step from II, by reacting equimolar amounts of II and 2-methyl-cyclopentane-1,3-dione in a mixture of toluene and acetic acid (2:1) during a short time at a temperature of 110–115° (oil bath temperature). The yield of pure product is 60–70%.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. The compound of claim 1 having the formula

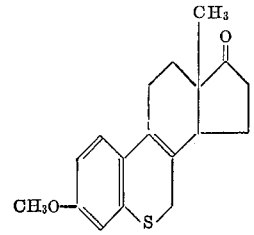

2. The 14α-isomer of the compound of claim 1.

References Cited

Lowy et al.: An Introduction to Organic Chemistry, John Wiley and Sons, New York (1945), p. 213.

Burger: Medicinal Chemistry, Interscience, New York (1960), p. 77.

Smith et al.: Experientia, vol. 20 (1964), p. 318 and 419.

JAMES A. PATTEN, *Primary Examiner.*

U.S. Cl. X.R.

260—240; 167—65